(12) United States Patent
Li et al.

(10) Patent No.: US 10,996,079 B1
(45) Date of Patent: May 4, 2021

(54) ENCODER OFFSET FINE TUNING

(71) Applicant: Rockwell Automation Technologies, Inc., Mayfield Heights, OH (US)

(72) Inventors: Bing Li, Mequon, WI (US); Takayoshi Matsuo, Mequon, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

(21) Appl. No.: 16/702,350

(22) Filed: Dec. 3, 2019

(51) Int. Cl.
*H02P 6/28* (2016.01)
*G01D 5/244* (2006.01)
*H02P 6/30* (2016.01)

(52) U.S. Cl.
CPC ............. *G01D 5/2448* (2013.01); *H02P 6/28* (2016.02); *H02P 6/30* (2016.02)

(58) Field of Classification Search
CPC . G01D 5/2448; H02P 6/28; H02P 6/30; H02P 6/22; H02P 6/10
See application file for complete search history.

(56) References Cited

U.S. PATENT DOCUMENTS

| | | | | |
|---|---|---|---|---|
| 7,719,224 B2 * | 5/2010 | Quan | ................ | G01D 5/24404 318/601 |
| 8,853,979 B2 * | 10/2014 | Wu | ........................... | H02P 6/20 318/400.02 |
| 9,641,108 B2 * | 5/2017 | Suda | ...................... | G01R 23/00 |
| 2006/0125439 A1 * | 6/2006 | Ajima | ..................... | B60L 50/16 318/716 |
| 2008/0061724 A1 * | 3/2008 | Hao | ........................ | H02P 21/18 318/661 |
| 2008/0201041 A1 * | 8/2008 | Jiang | ...................... | H02P 21/04 701/42 |
| 2016/0248354 A1 * | 8/2016 | Liu | ......................... | H02P 27/08 |
| 2017/0317633 A1 * | 11/2017 | Li | ......................... | H02K 11/225 |

* cited by examiner

*Primary Examiner* — Rina I Duda
(74) *Attorney, Agent, or Firm* — Kunzler Bean & Adamson (57) ABSTRACT

For encoder offset fine tuning, a processor iteratively reduces an encoder offset error of the motor with a third offset step until the motor starts. The processor iteratively modifies the encoder offset of the motor turning in a positive direction with a first offset step until the motor stops. The processor further records the encoder offset as a first encoder offset. The processor iteratively modifies the encoder offset with the first offset step until the motor starts turning in a negative direction. The negative direction is opposite the positive direction. The processor iteratively modifies the encoder offset with a second offset step until the motor stops. The processor records the encoder offset as a second encoder offset. In addition, the processor calculates a final encoder offset as a function of the first encoder offset and the second encoder offset.

20 Claims, 10 Drawing Sheets

| Motor Nameplate Peak Current 201 |
|---|
| Initial Encoder Offset 203 |
| First Encoder Offset 205 |
| Second Encoder Offset 207 |
| Final Encoder Offset 209 |
| Encoder Offset 211 |
| Offset Values 213 |
| Maximum Motor Current 215 |

ENCODER OFFSET FINE TUNING

BACKGROUND INFORMATION

The subject matter disclosed herein relates to encoder offset fine tuning.

BRIEF DESCRIPTION

A method for encoder offset fine tuning is disclosed. A processor iteratively reduces an encoder offset error of the motor with a third offset value until the motor starts. The processor iteratively modifies the encoder offset of the motor turning in a positive direction with a first offset value until the motor stops. The processor further records the encoder offset as a first encoder offset. The processor iteratively modifies the encoder offset with the first offset value until the motor starts turning in a negative direction. The negative direction is opposite the positive direction. The processor iteratively modifies the encoder offset with a second offset value until the motor stops. The second offset value has an opposite magnitude from the first offset value. The processor records the encoder offset as a second encoder offset. In addition, the processor calculates a final encoder offset as a function of the first encoder offset and the second encoder offset.

An apparatus for encoder offset fine tuning is also disclosed. The apparatus includes a processor and a memory storing code executable by the processor. The processor iteratively reduces an encoder offset error of the motor with a third offset value until the motor starts. The processor iteratively modifies the encoder offset of the motor turning in a positive direction with a first offset value until the motor stops. The processor further records the encoder offset as a first encoder offset. The processor iteratively modifies the encoder offset with the first offset value until the motor starts turning in a negative direction. The negative direction is opposite the positive direction. The processor iteratively modifies the encoder offset with a second offset value until the motor stops. The second offset value has an opposite magnitude from the first offset value. The processor records the encoder offset as a second encoder offset. In addition, the processor calculates a final encoder offset as a function of the first encoder offset and the second encoder offset.

A computer program product for encoder offset fine tuning is also disclosed. The computer program product includes a non-transitory computer readable storage medium having program code. The program code is readable/executable by a processor. The processor iteratively reduces an encoder offset error of the motor with a third offset value until the motor starts. The processor iteratively modifies the encoder offset of the motor turning in a positive direction with a first offset value until the motor stops. The processor further records the encoder offset as a first encoder offset. The processor iteratively modifies the encoder offset with the first offset value until the motor starts turning in a negative direction. The negative direction is opposite the positive direction. The processor iteratively modifies the encoder offset with a second offset value until the motor stops. The second offset value has an opposite magnitude from the first offset value. The processor records the encoder offset as a second encoder offset. In addition, the processor calculates a final encoder offset as a function of the first encoder offset and the second encoder offset.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. The term "and/or" indicates embodiments of one or more of the listed elements, with "A and/or B" indicating embodiments of element A alone, element B alone, or elements A and B taken together.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims, or may be learned by the practice of embodiments as set forth hereinafter. As will be appreciated by one skilled in the art, aspects of the present invention may be embodied as a system, method, and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the program code may be stored and/or propagated on in one or more computer readable medium(s).

The computer readable medium may be a tangible computer readable storage medium storing the program code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer readable storage medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store program code for use by and/or in connection with an instruction execution system, apparatus, or device.

The computer readable medium may also be a computer readable signal medium. A computer readable signal medium may include a propagated data signal with program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport program code for use by or in connection with an instruction execution system, apparatus, or device. Program code embodied on a computer readable signal medium may be transmitted using any appropriate medium, including but not limited to wire-line, optical fiber, Radio Frequency (RF), or the like, or any suitable combination of the foregoing.

In one embodiment, the computer readable medium may comprise a combination of one or more computer readable storage mediums and one or more computer readable signal mediums. For example, program code may be both propagated as an electro-magnetic signal through a fiber optic cable for execution by a processor and stored on RAM storage device for execution by the processor.

Program code for carrying out operations for aspects of the present invention may be written in any combination of one or more programming languages, including an object oriented programming language such as Python, Ruby, R, Java, Java Script, Smalltalk, C++, C sharp, Lisp, Clojure, PHP or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). The computer program product may be shared, simultaneously serving multiple customers in a flexible, automated fashion.

The computer program product may be integrated into a client, server and network environment by providing for the computer program product to coexist with applications, operating systems and network operating systems software and then installing the computer program product on the clients and servers in the environment where the computer program product will function. In one embodiment software is identified on the clients and servers including the network operating system where the computer program product will be deployed that are required by the computer program product or that work in conjunction with the computer program product. This includes the network operating system that is software that enhances a basic operating system by adding networking features.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and computer program products according to embodiments of the invention. It will be understood that each block of the schematic flowchart diagrams and/or schematic block diagrams, and combinations of blocks in the schematic flowchart diagrams and/or schematic block diagrams, can be implemented by program code. The program code may be provided to a processor of a general purpose computer, special purpose computer, sequencer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

The program code may also be loaded onto a computer, other programmable data processing apparatus, or other devices to cause a series of operational steps to be performed on the computer, other programmable apparatus or other devices to produce a computer implemented process such that the program code which executed on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

The description of elements in each figure may refer to elements of proceeding figures. Like numbers refer to like elements in all figures, including alternate embodiments of like elements.

Figure 1:
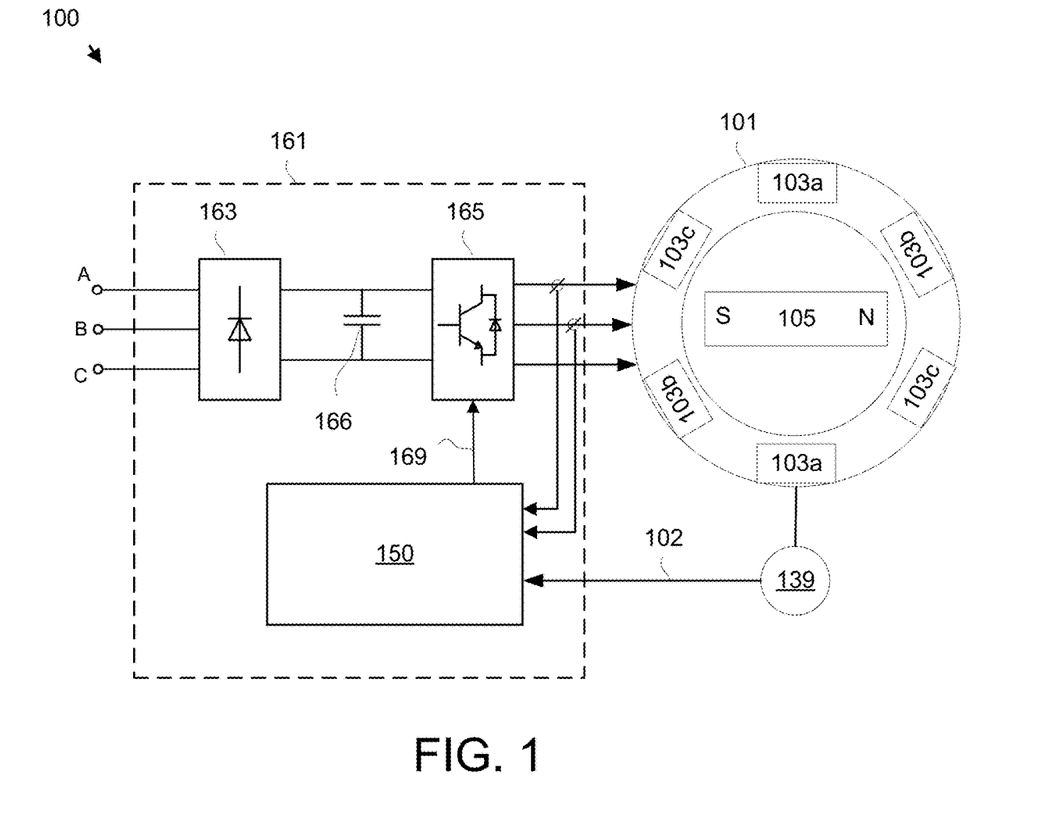
FIG. 1 is a schematic diagram of a motor system according to an embodiment.

FIG. 1 is a schematic diagram of motor system 100. The system 100 includes a motor 101 and a motor drive 161. The motor 101 may be a permanent magnet (PM) motor 101. Hereafter, the motor 101 is referred to as a PM motor 101, but other motors may be employed.

Figure 4:
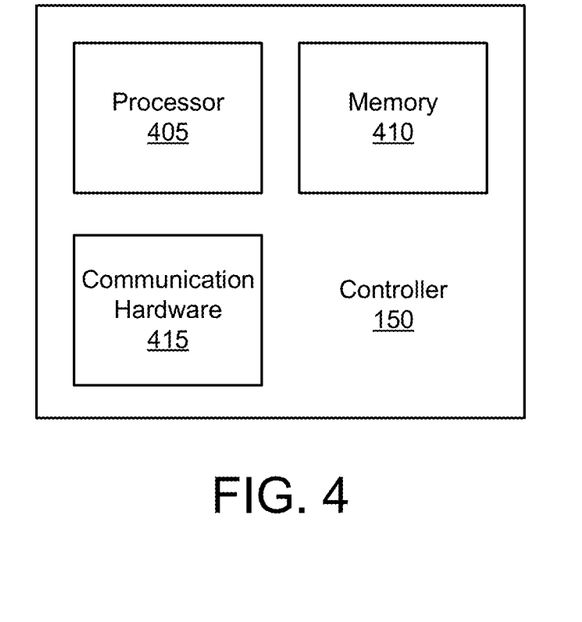
FIG. 4 is a schematic block diagram of a controller according to an embodiment.

The PM motor 101 may be controlled by the motor drive 161. In the depicted embodiment, the motor drive 161 includes a rectifier and/or converter 163, referred to hereafter as a rectifier 163, an inverter 165, a bus capacitor 166, and a controller 150. The controller 150 may include a processor as shown in FIG. 4. The controller 150 may produce the gate signals 169 to control the inverter 165, and therefore control the PM motor 101. The system 100 includes an encoder 139 that generates a position signal 102. The position signal 102 is used accurately control the PM motor 101.

In the depicted embodiment, the PM motor 101 includes a PM rotor 105 and a plurality of coils 103a-c. The motor drive 161 may direct electric currents through the coils 103a-c to generate a motor flux that drives the PM rotor 105.

The motor drive 161 may control the PM motor 101 to generate torque at a specified angular velocity. The motor drive 161 may be required to control the PM motor 101 within a narrow range of angular velocities for a variety of loads. In a certain embodiment, at least a portion of the motor drive 161 comprise one or more of hardware and executable code, the executable code stored on one or more computer readable storage media.

The position signal 102 may specify the position of the PM rotor 105 relative to a specified coil 103 and/or the corresponding magnetic pole. The position of the specified coil 103 may be described with an encoder offset. In one embodiment, a coarse estimate of the encoder offset may be obtained during a rotate autotune process.

Unfortunately, even a small error in the encoder offset may cause the PM motor 101 to run in regenerative mode under certain circumstances. For example, if the motor system 100 is running the PM motor 101 in torque mode at high speed with a small torque reference, an encoder offset error may cause the PM motor 101 to run in a regenerative mode and cause a bus voltage to rise, potentially resulting in a shutdown of the PM motor 101.

The embodiments described herein fine-tune the encoder offset. The fine-tuning of the encoder offset may be performed after an autotune process. The embodiments further reduce errors in the encoder offset to improve the function of the PM motor 101. As a result, the PM motor 101 operates more efficiently and does not unintentionally run in a regenerative mode.

Figure 2:
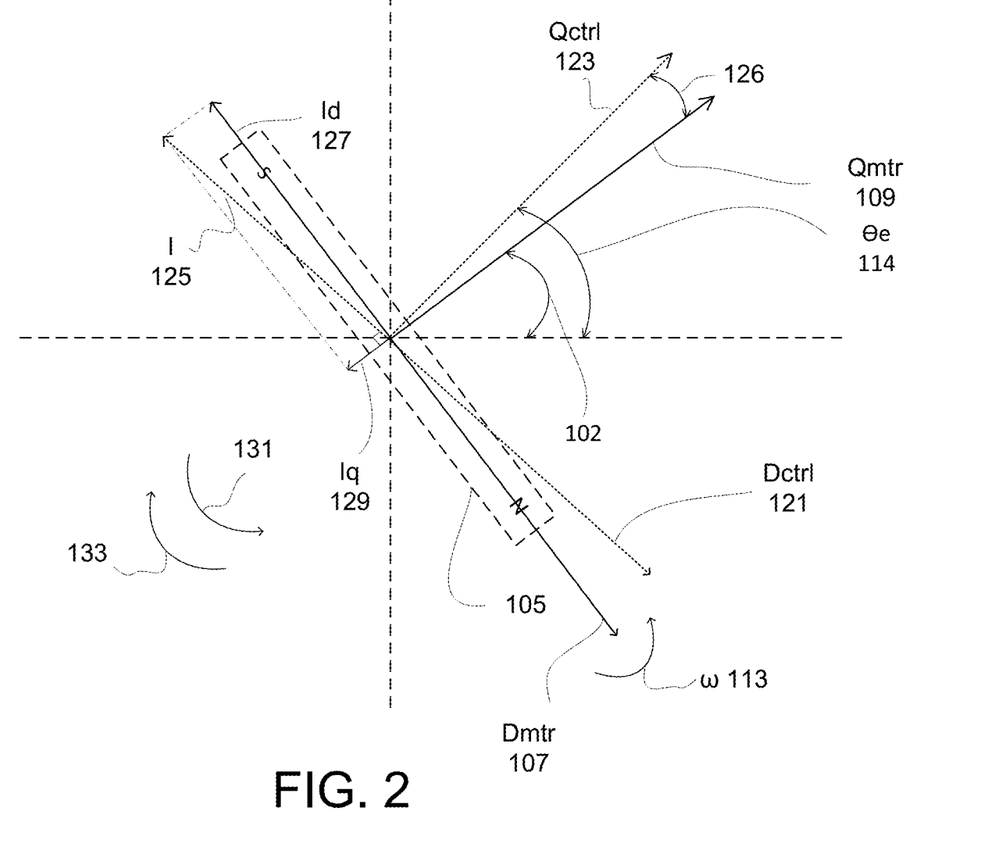
FIG. 2 is a drawing of a direct/quadrature axis according to an embodiment.

FIG. 2 is a drawing of a direct/quadrature (DQ) axis defined in synchronous reference frame. A motor direct vector Dmtr 107 indicates the angle of the PM rotor 105, and a motor quadrature vector Qmtr 109 indicates the quadrature angle of the PM rotor 105. The PM rotor 105 is driven by a drive current I 125, which is controlled in control DQ frame indicated as direct control axis Dctrl 121 and a quadrature control axis Qctrl 123. In case of encoder offset error exists, these two DQ frame are not aligned, a negative D axis drive current I 125 in control DQ frame could be projected to a direct current Id 127 and a quadrature current Iq 129 in motor DQ frame.

The control position θe 114 defines the DQ frame used to control the PM motor 101. The control position θe 114 may be determined from the position signal 102 and the encoder offset error 126 in close loop control. The position signal 102 may indicate the rotor position. The angular velocity ω 113 may also be determined from the position signal 102 and encoder offset 211 in close loop control. The PM motor 101 may turn in one of a positive direction 131 and a negative direction 133. The negative direction 133 is opposite the positive direction 131.

In the depicted embodiment, the encoder offset error 126 results in the misalignment of the drive current I 125 with the motor direct vector Dmtr 107, causing the generation of the negative quadrature current Iq 129 and the PM motor 101 to run in regenerative mode.

Figure 3:
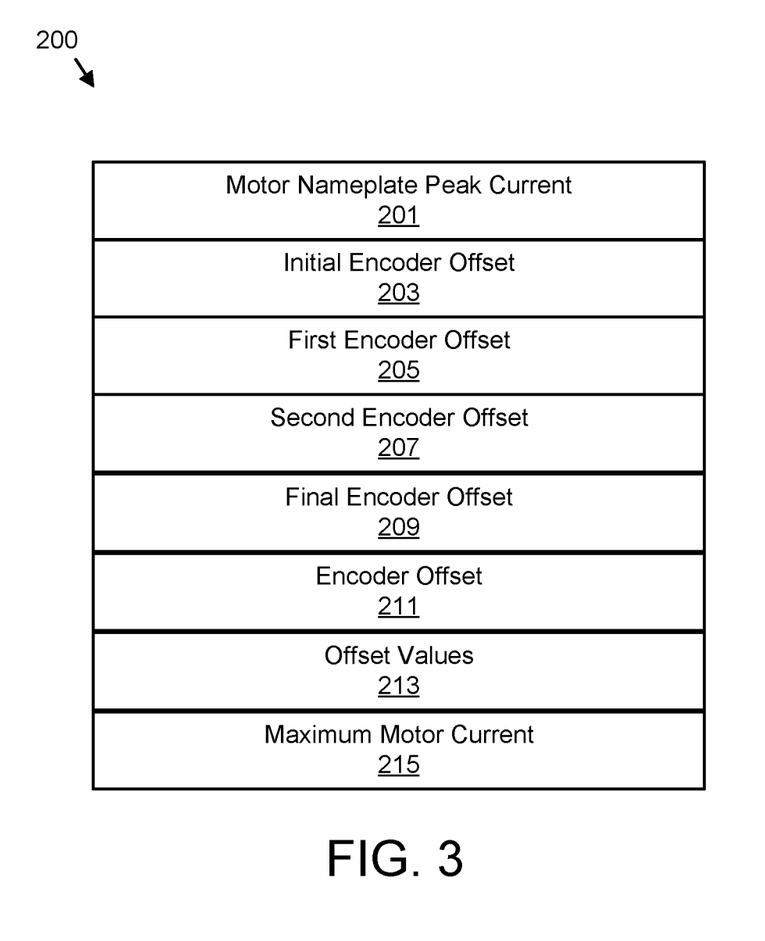
FIG. 3 is a schematic block diagram of parameter data according to an embodiment.

FIG. 3 is a schematic block diagram of parameter data 200. The motor data 200 may be organized as a data structure in a memory. In the depicted embodiment, the parameter data 200 includes a motor nameplate peak current 201, an initial encoder offset 203, a first encoder offset 205, a second encoder offset 207, the final encoder offset 209, the encoder offset 211, offset values 213, and a maximum motor current 215.

The motor nameplate peak current 201 may record the motor nameplate peak current specified for the PM motor 101. The maximum motor current 215 may record a maximum current that the PM motor 101 is rated for. The initial encoder offset 203 may record an encoder offset determined from an autotune process.

The first encoder offset 205 records an encoder offset determined from the encoder offset calculation method. The second encoder offset 207 also records an encoder offset determined from the encoder offset calculation method. The first encoder offset 205 and the second encoder offset 207 are typically different values that are used to calculate the final encoder offset 209.

The encoder offset 211 is the encoder offset used by the controller 150 in controlling the PM motor 101. After an autotune process, the initial encoder offset 203 may be copied to the encoder offset 211. In addition, after the encoder offset calculation method, the final encoder offset 209 may be copied to the encoder offset 211 and used to control the PM motor 101.

The offset values 213 may record values that are used to modify the encoder offset 211 during the encoder offset calculation method. In one embodiment, different offset values 213 are used for each direction of the PM motor 101. In addition, the offset values 213 may include a plurality of offset values 213 from course offset values 213 to fine offset values 213. In a certain embodiment, the offset values 213 may include different offset values 213 for decreasing and increasing the encoder offset 211.

FIG. 4 is a schematic block diagram of the controller 150. In the depicted embodiment, the controller 150 includes a processor 405, a memory 410, and communication hardware 415. The memory 410 may be a semiconductor storage device. The memory 410 may store code and data, including the motor data 200. The processor 405 may execute the code. The communication hardware 415 may communicate with other devices, such as the inverter 165 and the encoder 139.

Figure 5:
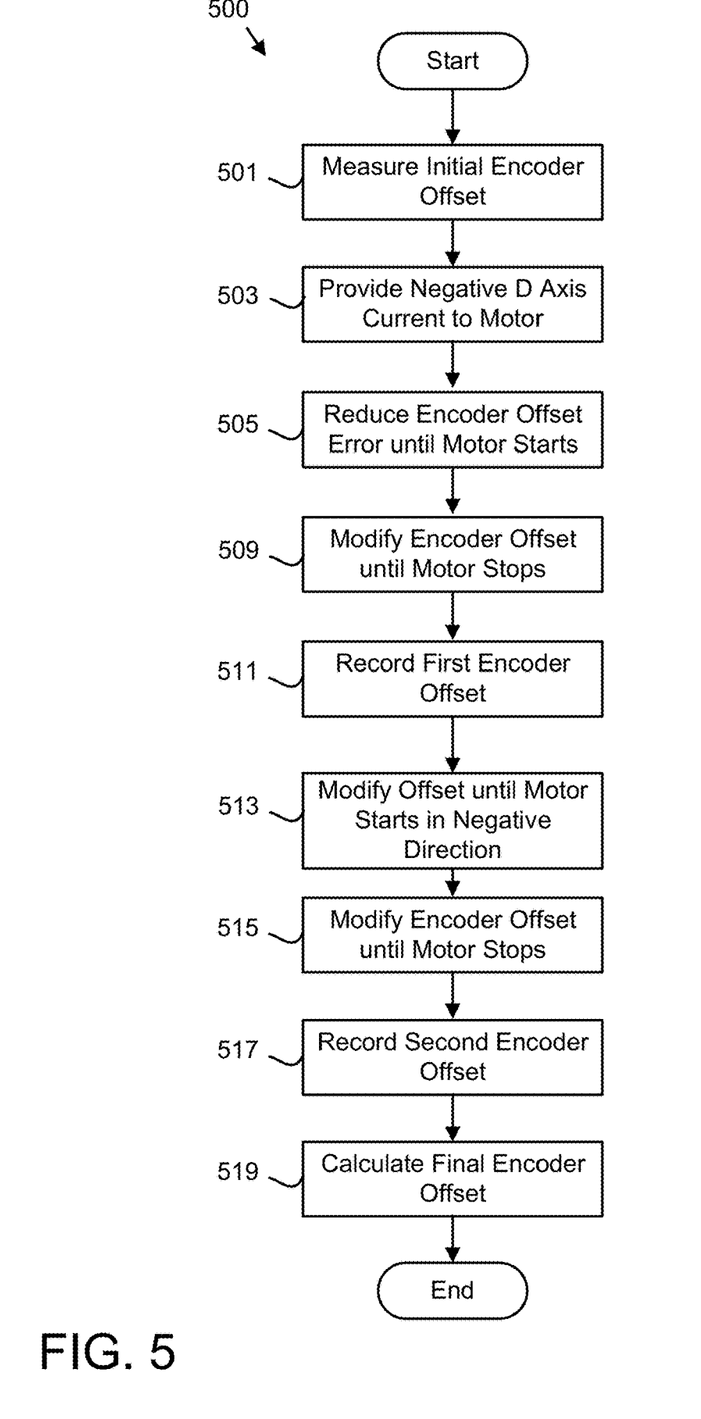
FIG. 5 is a schematic flow chart diagram of an encoder offset calculation method according to an embodiment.
Figure 6A:
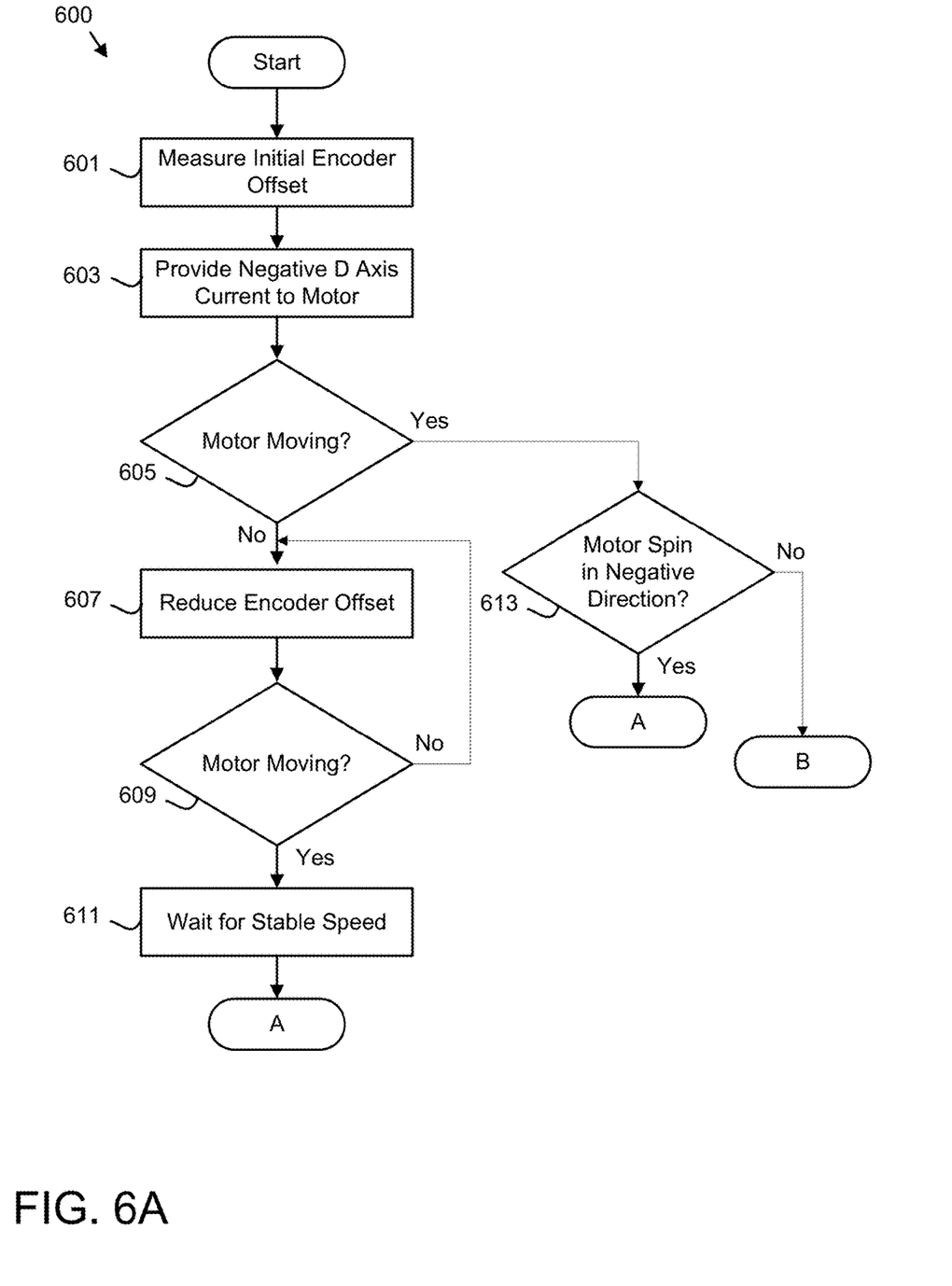
FIGS. 6A-D is a schematic flow chart diagram of an alternate encoder offset calculation method according to an embodiment.
Figure 6B:
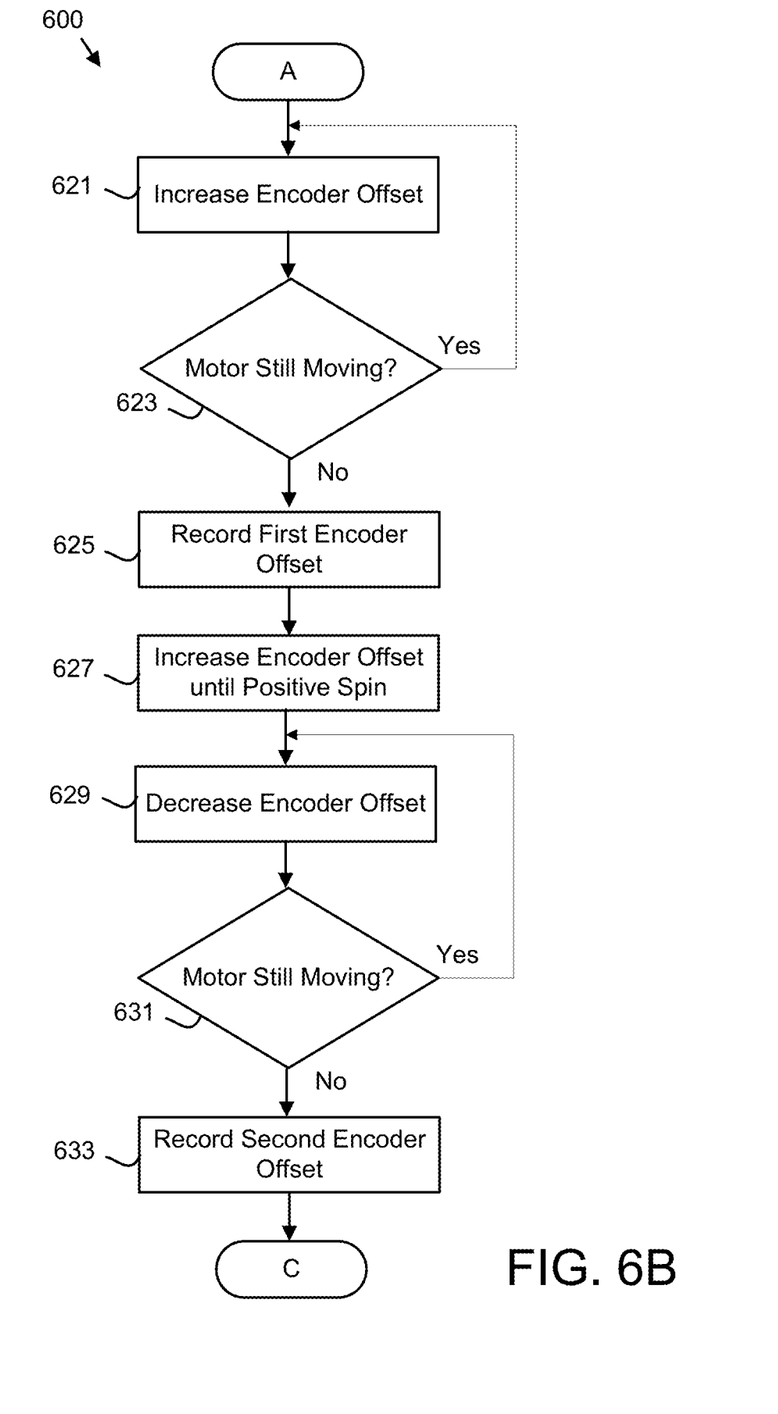
Figure 6C:
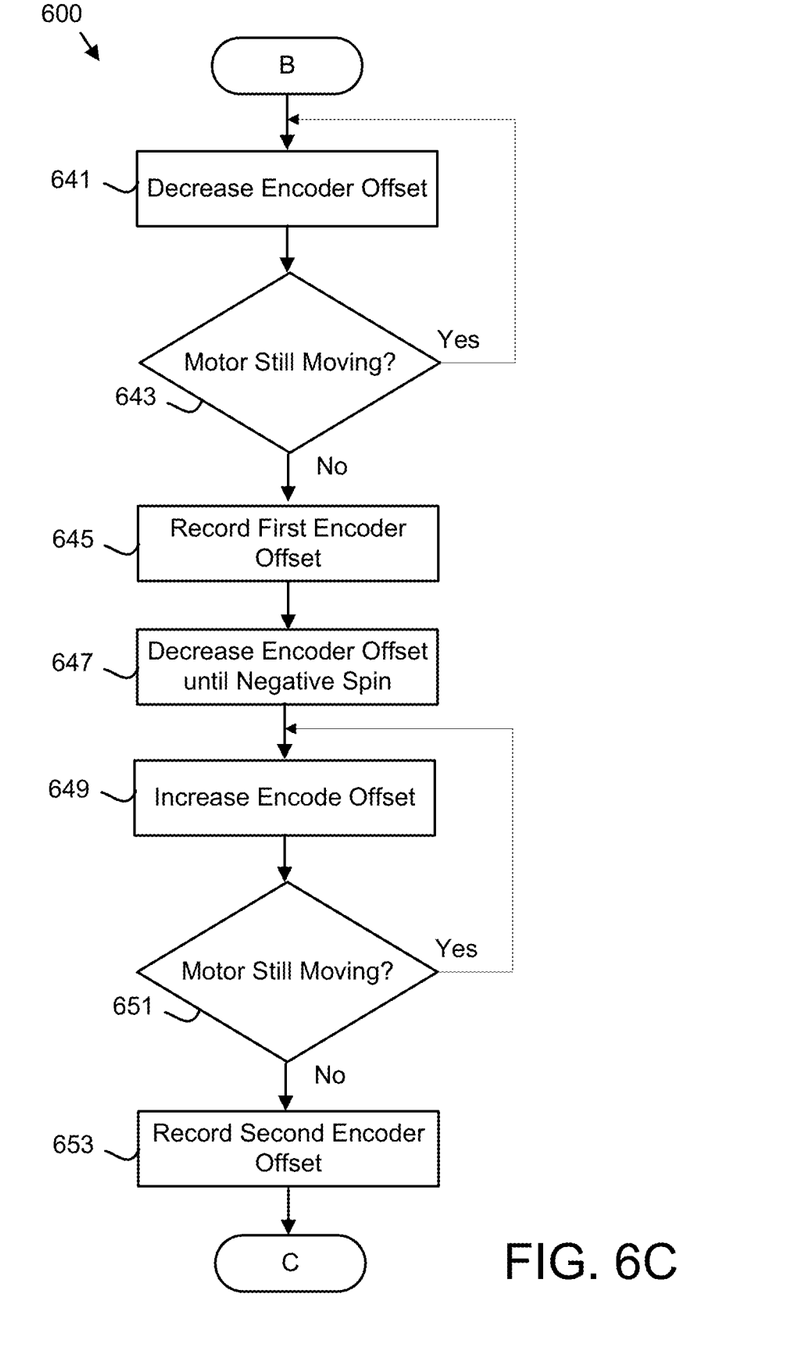
Figure 6D:
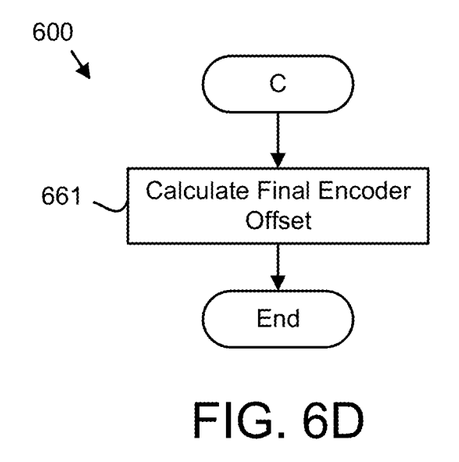

FIG. 5 is a schematic flow chart diagram of an encoder offset calculation method 500. The method 500 may calculate the final encoder offset 209 that is used as the encoder offset 211 to control the PM motor 101. The method 500 may be performed by the controller 150 and/or the processor 405.

The method 500 starts, and in one embodiment, the processor 405 measures 501 the initial encoder offset 203. The initial encoder offset 203 may be measured 501 with a rotate autotune process. In addition, the initial encoder offset 203 may be pre-specified for the encoder 139 and/or PM motor 101.

The processor 405 may provide 503 negative D axis current 127 to the motor 101. The encoder offset 211 may be the initial encoder offset 203. In one embodiment, the negative D axis current 127 is a value between a motor nameplate peak current 201 and a maximum motor current 215. In a certain embodiment, the negative D axis current 127 is a highest current that does not de-magnetize the PM motor 101. The test quadrature axis current 129 may be zero.

The processor 405 may iteratively reduce 505 the encoder offset 211 of the motor 101 with a third offset value 213 until the PM motor 101 starts turning in the negative direction 133. For example, the processor 405 may iteratively subtract the third offset value 213 from the encoder offset 211 until the PM motor 101 starts turning in the negative direction 133.

In response to the PM motor 101 starting to turn, the processor 405 may iteratively modify 509 the encoder offset 211 of the motor 101 moving in a negative direction 133 with a first offset value 213 until the PM motor 101 stops turning. In one embodiment, the processor 405 adds the first offset value 213 to the encoder offset 211 to modify 509 the encoder offset 211.

In response to the PM motor 101 stopping, the processor 405 records 511 the encoder offset 211 as a first encoder offset 205. The encoder offset 211 may be recorded 511 after the motor speed stabilizes. The motor speed may be stabilized when there is no change in angular velocity 113. In one embodiment, the processor 405 copies the encoder offset 211 to the first encoder offset 205.

The processor 405 may iteratively modify 513 the encoder offset 211 with the first offset value 213 until the motor 101 starts turning in the positive direction 131. In addition, the processor 405 may iteratively modify 515 the encoder offset 211 with a second offset value 213 until the PM motor 101 stops. The second offset value 213 has an opposite magnitude from the first offset value 213.

In response to the PM motor 101 stopping, the processor 405 records 517 the encoder offset 211 as the second encoder offset 207. The encoder offset 211 may be recorded 511 after the motor speed stabilizes. The processor 405 may copy the encoder offset 211 to the second encoder offset 207.

The processor 405 further calculates 519 the final encoder offset 209 as a function of the first encoder offset 205 and the second encoder offset 207 and the method 500 ends.

In one embodiment, the final encoder offset 209 is calculated 519 as an average the first encoder offset 205 and the second encoder offset 207. The final encoder offset 209 may be calculated 519 as the average if the static friction in both rotating directions 131/133 is the same.

In one embodiment, the final encoder offset 209 is calculated 519 as an interpolation between the first encoder offset 205 and the second encoder offset 207. The final encoder offset 209 may be calculated 519 as an interpolation if the static friction in the negative direction 133 is not equal to the static friction in the positive direction 131. The interpolation may be based on a static friction ratio SFR of static friction in the negative direction 133 divided by static friction in the positive direction 131 as shown in Equation 1, where FEO is the final encoder offset 209, EO1 is the first encoder offset 205, and EO2 is the second encoder offset 207.

$$FEO=((EO1-EO2)/(1+SFR))+EO2 \quad \text{Equation 1}$$

FIGS. 6A-D is a schematic flow chart diagram of an alternate encoder offset calculation method 600. The method 600 may calculate the final encoder offset 209 that is used as the encoder offset 211 to control the PM motor 101. The method 600 may be performed by the processor 405.

The method 600 starts, and in one embodiment, the processor 405 measures 601 the initial encoder offset 203. The initial encoder offset 203 may be measured 601 with the rotate autotune process. In addition, the initial encoder offset 203 may be pre-specified for the encoder 139 and/or PM motor 101.

The processor 405 may provide 603 the negative D axis current 127 to the motor 101. The encoder offset 211 may be the initial encoder offset 203. In one embodiment, the negative D axis current 127 is a value between a motor nameplate peak current 201 and a maximum motor current 215. In a certain embodiment, the negative D axis current 127 is a highest current that does not de-magnetize the PM motor 101. The test quadrature axis current 129 may be zero.

The processor 405 further determines 605 if the PM motor 101 is moving. If the PM motor 101 is not moving, the processor 405 reduces 607 the encoder offset 211. The processor 405 may reduce 607 the encoder offset 211 by the third offset value 213. The processor 405 determines 609 if the PM motor 101 is moving. If the PM motor 101 is not moving, the processor 405 continues to reduce 607 the encoder offset 211.

If the processor 405 determines 609 that the PM motor 101 is moving, the processor 405 may wait 609 for the motor speed to stabilize. In one embodiment, the processor 405 waits 609 until the angular velocity 113 is zero.

If the PM motor is moving in step 605, the processor 405 further determines 613 if the PM motor 101 is moving in the negative direction 133. If the PM motor 101 is moving in the negative direction 133 or if the processor 405 determined 609 that the PM motor 101 is moving and/or waited for the motor speed to stabilize, the processor 405 increases 621 the encoder offset 211. The processor 405 may increase 621 the encoder offset 211 with the first offset value 213.

The processor 405 may determine 623 if the PM motor 101 is still moving. If the PM motor 101 is still moving, the processor 405 continues to increase 621 the encoder offset 211. If the PM motor 101 is not moving, the processor 405 records 625 the encoder offset 211 as the first encoder offset 205.

The processor 405 further increases 627 the encoder offset 211 until the PM motor 101 begins moving in the positive direction 131. The processor 405 may increase 627 the encoder offset 211 by the first offset value 213.

In response to the PM motor 101 moving in the positive direction 131, the processor 405 decreases 629 the encoder offset 211. The processor 405 may decrease 629 encoder offset 211 by the second offset value 213.

The processor 405 determines 631 if the PM motor 101 is still moving. If the PM motor 101 is still moving, the processor 405 decreases 629 the encoder offset 211. If the PM motor 101 is not moving, the processor 405 records 633 the encoder offset 211 as the second encoder offset 207.

If the processor 405 determines 613 the PM motor 101 is not moving in the negative direction 133, the processor 405 decreases 641 the encoder offset 211. The processor 405 may decrease 641 the encoder offset 211 with the first offset value 213. The processor 405 may determine 643 if the PM motor 101 is still moving. If the PM motor 101 is still moving, the processor 405 continues to decrease 641 the encoder offset 211. If the PM motor 101 is not moving, the processor 405 records 645 the encoder offset 211 as the first encoder offset 205.

The processor 405 decreases 647 the encoder offset 211 until the PM motor 101 begins moving in the negative direction 133. The processor 405 may decrease 647 the encoder offset 211 by the first offset value 213.

In response to the PM motor 101 moving in the negative direction 133, the processor 405 increases 649 the encoder offset 211. The processor 405 may increase 649 encoder offset 211 by the second offset value 213.

The processor 405 determines 651 if the PM motor 101 is still moving. If the PM motor 101 is still moving, the processor 405 increases 649 the encoder offset 211. If the PM motor 101 is not moving, the processor 405 records 653 the encoder offset 211 as the second encoder offset 207.

In response to recording 633/653 the second encoder offset 207, the processor 405 may calculate 661 the final encoder offset 209 and the method 600 ends. The final encoder offset 209 may be calculated 661 as described for step 519 of FIG. 5.

Figure 7:
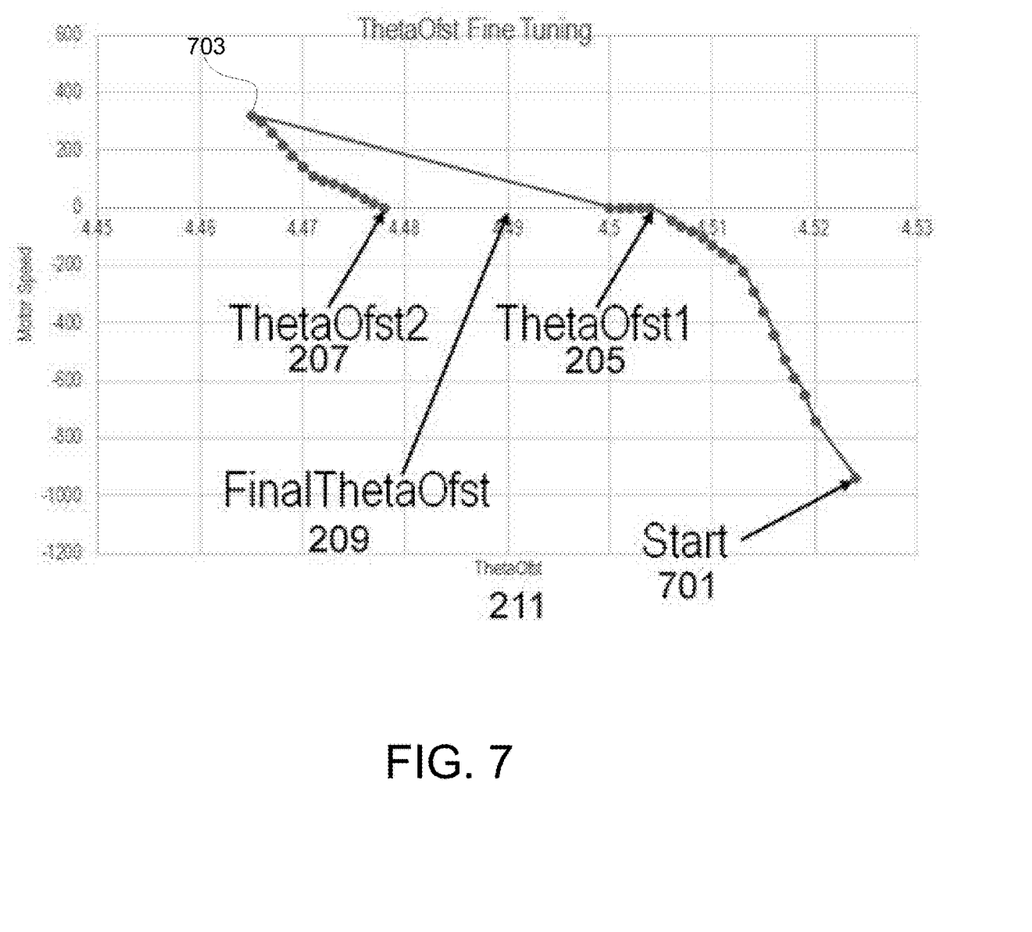
FIG. 7 is a graph of a test result for an encoder offset calculation method according to an embodiment.

FIG. 7 is a graph of a test result for the encoder offset calculation method 500. The graph shows the encoder offset 211 for various motor speeds during the encoder offset calculation method 500. As described in step 505, the encoder offset 211 is reduced until the PM motor 101 starts at start 701. At start 701, the PM motor 101 has a nonzero motor speed. The encoder offset 211 is further modified until the motor speed is zero at the first encoder offset 205. The encoder offset 211 is modified until the PM motor 101 starts in the opposite direction at the opposite start 703. The encoder offset 211 is again modified until the motor speed is zero at the second encoder offset 207. The final encoder offset 209 is calculated as a function of the first encoder offset 205 and the second encoder offset 207.

Problem/Solution

The position of coil 103 and/or PM rotor 105 of the PM motor 101 must be known by the controller 150 to efficiently control the PM motor 101. The position of coil 103 and/or PM rotor 105 may be described in part with the encoder offset 211. Although the encoder offset 211 may be coarsely estimated with the rotate autotune process, the embodiments fine-tune the encoder offset 211. As a result, the controller 150 may more efficiently control the PM motor 101.

This description uses examples to disclose the invention and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method comprising:
   measuring an initial encoder offset of a motor;
   iteratively reducing, by use of a processor, an encoder offset error of the motor with a third offset value until the motor starts;
   iteratively modifying the encoder offset of the motor turning in a positive direction with a first offset value until the motor stops;
   recording the encoder offset for the stopped motor as a first encoder offset;
   iteratively modifying the encoder offset with the first offset value until the motor starts turning in a negative direction, wherein the negative direction is opposite the positive direction;

iteratively modifying the encoder offset with a second offset value until the motor stops, wherein the second offset value has an opposite magnitude from the first offset value;

recording the encoder offset for the stopped motor as a second encoder offset; and calculating a final encoder offset as a function of the first encoder offset, the second encoder offset, and a static friction ratio, wherein the static friction ratio is static friction in the negative direction divided by static friction in the positive direction.

2. The method of claim 1, the method further comprising providing a negative D axis current to the motor.

3. The method of claim 2, wherein the negative D axis current is between a motor nameplate peak current and a maximum motor current.

4. The method of claim 1, wherein the initial encoder offset is recorded after motor speed stabilizes.

5. The method of claim 1, wherein a test quadrature axis current is zero while iteratively modifying the encoder offset with the first offset value and the second offset value.

6. The method of claim 1, wherein a final encoder offset is calculated as an average the first encoder offset and the second encoder offset modified by the static friction ratio.

7. The method of claim 1, wherein a final encoder offset is calculated as an interpolation between the first encoder offset and the second encoder offset based on static friction ratio in two directions.

8. The method of claim 1, wherein the final encoder offset FEO is calculated as FEO=((EO1−EO2)/(1+SFR))+EO2, where EO1 is the first encoder offset, EO2 is the second encoder offset, and SFR is the static friction ratio.

9. An apparatus comprising:
an inverter that controls a motor;
a processor;
a memory storing code executable by the processor to perform:
measuring an initial encoder offset of the motor;
iteratively reducing an encoder offset error of the motor with a third offset value until the motor starts;
iteratively modifying the encoder offset of the motor turning in a positive direction with a first offset value until the motor stops;
recording the encoder offset for the stopped motor as a first encoder offset;
iteratively modifying the encoder offset with the first offset value until the motor starts turning in a negative direction, wherein the negative direction is opposite the positive direction;
iteratively modifying the encoder offset with a second offset value until the motor stops, wherein the second offset value has an opposite magnitude from the first offset value;
recording the encoder offset for the stopped motor as a second encoder offset; and
calculating a final encoder offset as a function of the first encoder offset, the second encoder offset, and a static friction ratio, wherein the static friction ratio is static friction in the negative direction divided by static friction in the positive direction.

10. The apparatus of claim 9, the processor further providing a negative D axis current to the motor.

11. The apparatus of claim 10, wherein the negative D axis current is between a motor nameplate peak current and a maximum motor current.

12. The apparatus of claim 9, wherein the initial encoder offset is recorded after motor speed stabilizes.

13. The apparatus of claim 9, wherein a test quadrature axis current is zero while iteratively modifying the encoder offset with the first offset value and the second offset value.

14. The apparatus of claim 9, wherein the final encoder offset FEO is calculated as FEO=((EO1−EO2)/(1+SFR))+EO2, where EO1 is the first encoder offset, EO2 is the second encoder offset, and SFR is the static friction ratio.

15. A computer program product comprising a non-transitory computer readable storage medium having program code embodied therein, the program code readable/executable by a processor to perform:
measuring an initial encoder offset of a motor;
iteratively reducing an encoder offset error of the motor with a third offset value until the motor starts;
iteratively modifying the encoder offset of the motor turning in a positive direction with a first offset value until the motor stops;
recording the encoder offset for the stopped motor as a first encoder offset;
iteratively modifying the encoder offset with the first offset value until the motor starts turning in a negative direction, wherein the negative direction is opposite the positive direction;
iteratively modifying the encoder offset with a second offset value until the motor stops, wherein the second offset value has an opposite magnitude from the first offset value;
recording the encoder offset for the stopped motor as a second encoder offset; and
calculating a final encoder offset as a function of the first encoder offset and the second encoder offset, and a static friction ratio, wherein the static friction ratio is static friction in the negative direction divided by static friction in the positive direction.

16. The computer program product of claim 15, the processor further providing a negative D axis current to the motor.

17. The computer program product of claim 16, wherein the negative D axis current is between a motor nameplate peak current and a maximum motor current.

18. The computer program product of claim 15, wherein the initial encoder offset is recorded after motor speed stabilizes.

19. The computer program product of claim 15, wherein a test quadrature axis current is zero while iteratively modifying the encoder offset with the first offset value and the second offset value.

20. The computer program product of claim 15, wherein the final encoder offset FEO is calculated as FEO=((EO1−EO2)/(1+SFR))+EO2, where EO1 is the first encoder offset, EO2 is the second encoder offset, and SFR is the static friction ratio.

* * * * *